No. 747,841. PATENTED DEC. 22, 1903.
G. BAEHR.
ELECTRIC APPARATUS FOR WELDING TUBES.
APPLICATION FILED JAN. 31, 1902.
NO MODEL. 3 SHEETS—SHEET 1.
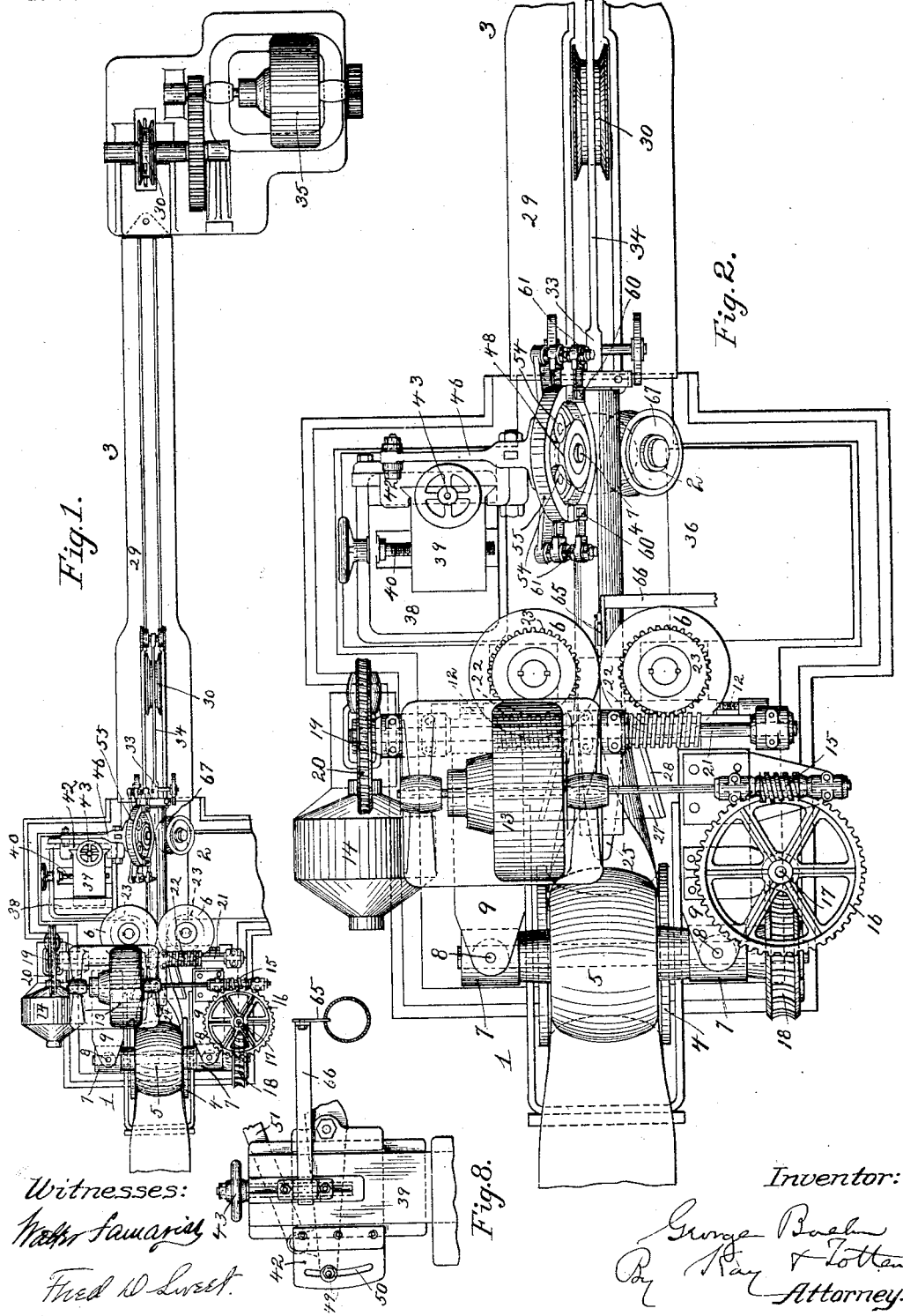
Witnesses:
Inventor:
George Baehr
By Ray & Totten
Attorneys.

No. 747,841. PATENTED DEC. 22, 1903.
G. BAEHR.
ELECTRIC APPARATUS FOR WELDING TUBES.
APPLICATION FILED JAN. 31, 1902.
NO MODEL. 3 SHEETS—SHEET 2.
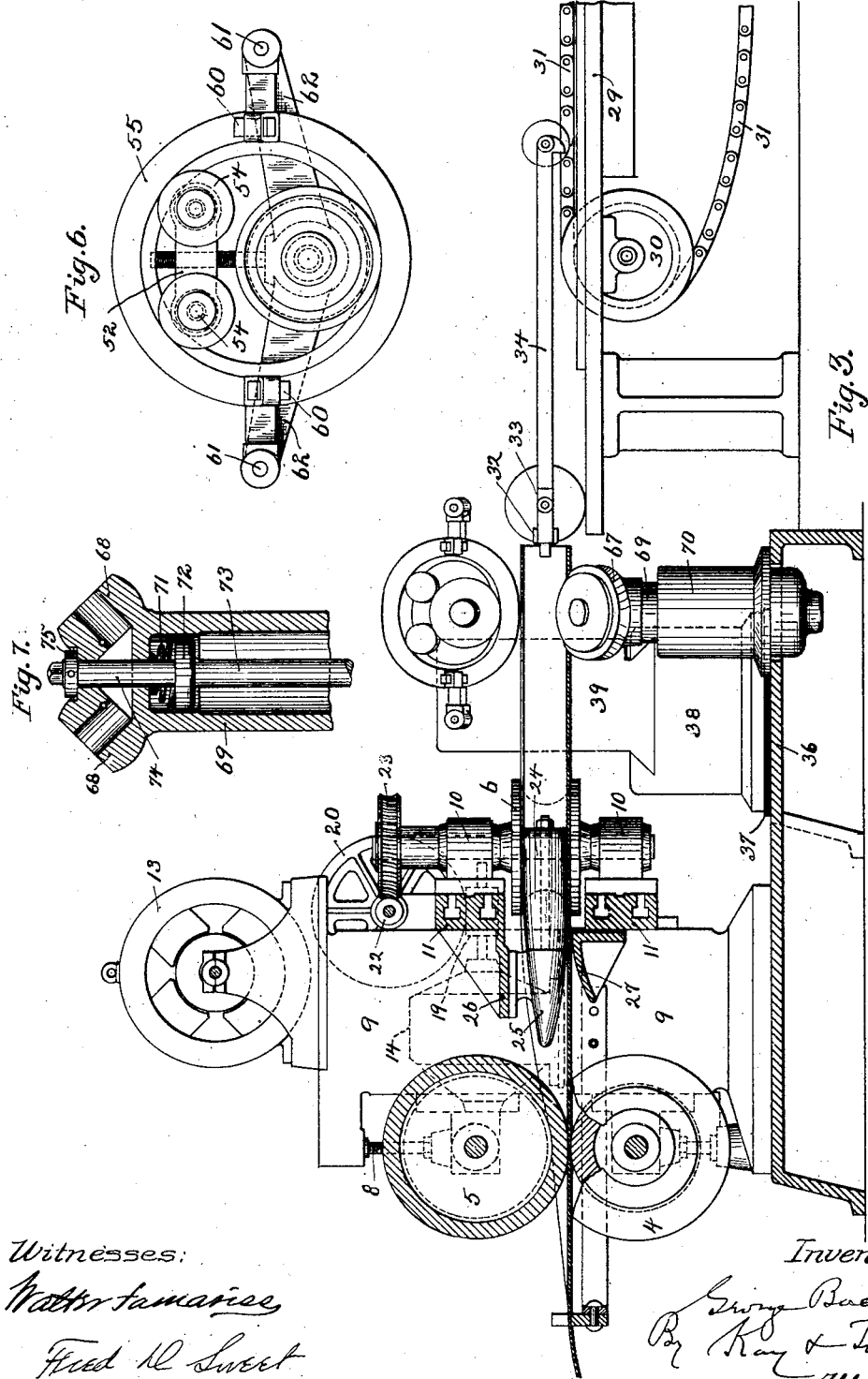
Witnesses:
Inventor:

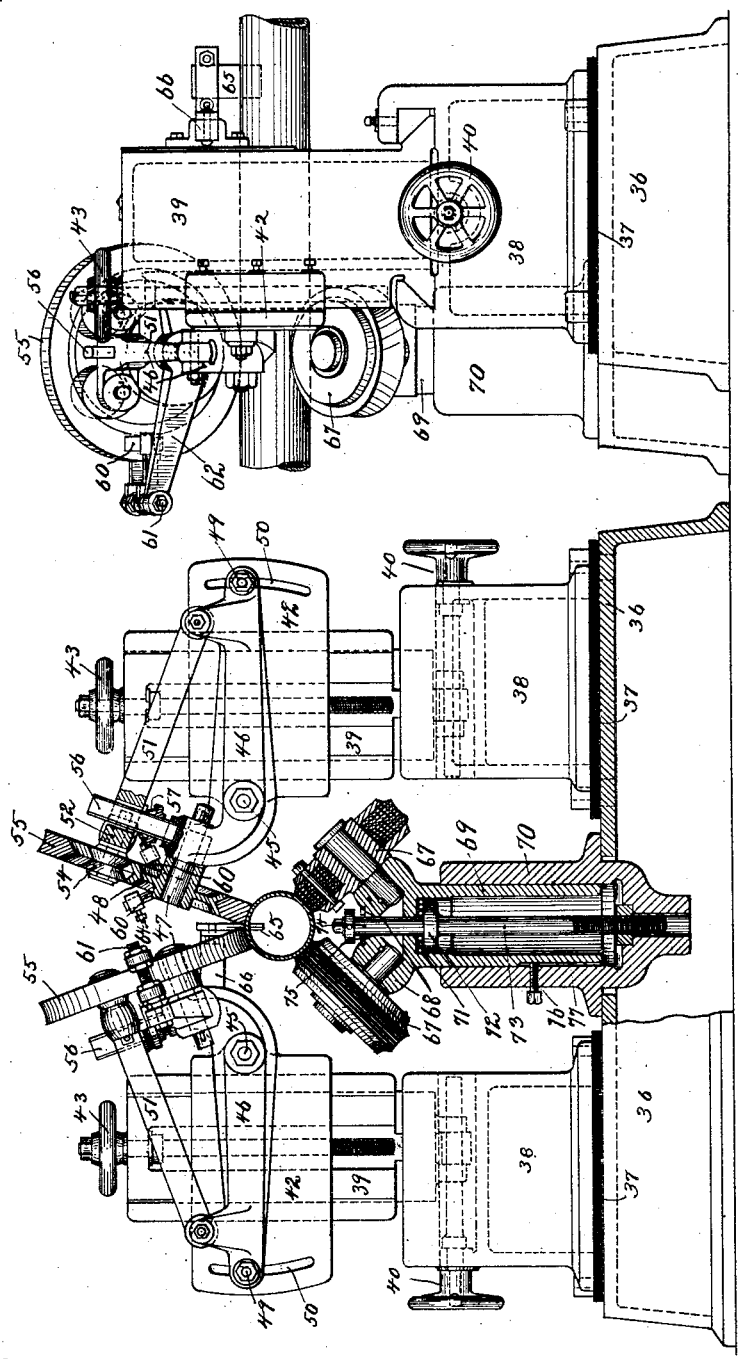

No. 747,841.

Patented December 22, 1903.

UNITED STATES PATENT OFFICE.

GEORGE BAEHR, OF McKEESPORT, PENNSYLVANIA, ASSIGNOR TO NATIONAL TUBE COMPANY, OF PITTSBURG, PENNSYLVANIA, A CORPORATION OF NEW JERSEY.

ELECTRIC APPARATUS FOR WELDING TUBES.

SPECIFICATION forming part of Letters Patent No. 747,841, dated December 22, 1903.

Application filed January 31, 1902. Serial No. 92,033. (No model.)

*To all whom it may concern:*

Be it known that I, GEORGE BAEHR, a resident of McKeesport, in the county of Allegheny and State of Pennsylvania, have invented a new and useful Improvement in Electric Apparatus for Welding Tubes; and I do hereby declare the following to be a full, clear, and exact description thereof.

My invention relates to an electric tube-welding machine; and its object is to provide a machine for this purpose in which the welding apparatus is readily adjustable to adapt it to tubes of various sizes.

A further object of my invention is to provide a machine which will progressively bend a flat plate into tubular form and progressively weld the joint thereof electrically.

A further object of my invention is to improve a machine of this kind in details of construction, as will hereinafter appear.

In the accompanying drawings, Figure 1 is a plan view of my improved machine, one side of the welding apparatus being omitted. Fig. 2 is a similar view enlarged of the main portion of said machine. Fig. 3 is a central longitudinal vertical section through bending and welding mechanism. Fig. 4 is a transverse sectional view through the welding mechanism. Fig. 5 is a side view of the same. Fig. 6 is a detail and face view of the planetary welding roll or wheel. Fig. 7 is a sectional detail of the tube-support, and Fig. 8 is a front view of one of the slides which support the welding-rolls.

My machine in its entirety comprises the plate-bending mechanism 1, the tube-welding mechanism 2, and the feeding or drawing mechanism 3.

The plate-bending mechanism may be of any suitable construction for progressively bending a flat plate into tubular form. A variety of such bending mechanisms are well known in the art, and they may all be adapted for the purposes of my machine. In the drawings I have shown such mechanism composed of two sets of rolls, the first set comprising the concave roll 4 and the convex roll 5 and the second set comprising two grooved rolls 6. The first set of rolls bend the plate into trough form and the second set bend the trough into tubular form, as will be readily understood. The rolls 4 and 5 are mounted in suitable bearings 7, which are supported on the housings 9 and which are adjusted toward and from each other by means of the screws 8. The rolls 6 are mounted in suitable bearings 10, which are suitably supported on the cross-beams 11, secured to the housings 9. Suitable screws or bolts 12 are provided for adjusting these rolls horizontally on said cross-beams. Both set of bending-rolls may revolve idly, the plate being drawn or otherwise suitably fed therethrough; but I prefer to drive the rolls positively, so that they will feed the plate forward. Any convenient mechanism for positively driving the rolls may be employed; but I prefer to employ electric motors for this purpose. A single electric motor could be used for driving both pairs of rolls by means of suitable intermediate gearing; but I prefer to use a separate motor for driving each pair of rolls and have therefore shown a motor 13 for driving the rolls 4 and 5 and a motor 14 for driving the rolls 6. The motor 13 has its armature-shaft provided with the worm 15, which meshes with the worm-wheel 16 on the upper end of a shaft 17, to which shaft are secured two worms, (not shown,) one right hand and the other left hand, which mesh, respectively, with corresponding worm-wheels 18 on the shafts of each of the rolls 4 and 5. The motor 14 has its armature-shaft provided with a worm 19, which meshes with a worm-wheel 20 on the horizontal shaft 21, said shaft being provided with two worms 22, one right hand and the other left hand, which mesh with the worm-wheels 23 on the shafts of the rolls 6. The motors 13 and 14 will be supported on the frame in any suitable position, and any suitable intermediate gearing may be used to connect them to the rolls 4, 5, and 6, that shown being only one form of many adapted for this purpose. By using separate motors for driving the two sets of bending-rolls the gearing can be much simplified, thus reducing friction, and an elastic or yielding pull on the plate may be secured by giving the motor 14 a slightly higher speed than the motor 13. To insure the bending of the plate into perfect tubular form, it may be desirable to use an internal mandrel or bulb, and I have shown for this purpose a mandrel 24, secured to a cone 25, depending from a plate 26, integral with or suitably secured to the cross-beam 11. The mandrel or bulb, however, may be supported in any other of the ways well known in the art. The mandrel or bulb 25 intersects the pass between the rollers 6 and supports the tubular blank internally. A suitable guide-plate 27, having upturned sides 28, is located between the first and second sets of rolls to guide the end of the plate into the pass between the rolls 6. The two sets of rolls shown, when positively driven, will feed the bent-up plate to the welding mechanism 2 and may even force the same through said welding mechanism without the aid of any other feeding mechanism; but as an additional means for feeding the tube forward I prefer, for abundant caution, to use some form of pulling or feeding mechanism in advance of the welding mechanism. A variety of mechanisms for this purpose may be used, and in the drawings I have shown an ordinary draw-bench 29, provided with the sprocket or like wheels 30, over which passes an ordinary draw-chain 31. Any convenient form of grip and buggy may be used, and in the drawings I have shown a grip diagrammatically at 32, the same being mounted on a buggy 33, having a hooked arm 34, which is adapted to catch onto the draw-chain in a manner well understood in the art. The draw-chain may be driven by any suitable mechanism, and I have shown for this purpose the electric motor 35, which may be geared to the rear sprocket-wheel 30 by means of any suitable intermediate gearing. This drawing mechanism may, if desired, draw the plate not only through the welding mechanism, but also through the bending-rolls, so that the latter may run idly. In that event, however, a grip would have to be employed which can pass through both the welding and the bending mechanisms. I prefer, therefore, to positively drive the bending-rolls and use the chain 31 only as an additional means to insure the positive feeding of the plate and tube through the apparatus. The motor 35 is preferably run at a slightly higher speed than the motor 14, thereby securing an elastic or yielding pull on the plate and tube as they pass through the bending and welding mechanisms.

The welding apparatus 2 comprises two similar mechanisms located on the opposite sides of the tube. These mechanisms are each suitably insulated from the bed-plate 36, as by a non-conducting plate 37. Each mechanism comprises a base 38, provided with a suitable transverse guideway, in which moves the slide-post 39, the latter being moved toward and from the center of the machine by any suitable means, such as an ordinary screw and hand wheel 40, operating in the well-known manner of moving slide-rests in lathes. This slide-post 39 is provided on one side with suitable guides for receiving a vertically-movable slide 42, the same being moved by means of a screw and hand wheel 43, as will be readily understood. Pivoted to the slide 42, as at 45, is a lever 46, which carries at its inner end a journal-bearing 47 for a pressure-roller 48. The outer end of the lever is provided with a clamp-bolt 49, which moves in a curved slot 50 in the slide 42, the arc of said slot being struck about the pivot 45 as a center. By this means the lever 46 can be swung about the pivotal point 45 and locked in any desired position by means of the bolt 49. Pivoted at its outer end to the outer end of the lever 46 is another lever 51, which carries at its inner end a cross-head 52, provided with suitable journal-bearings for a pair of guide-rollers 54. The pressure-roller 48 and the guide-rollers 54 bear on the inner periphery of the planetary current conducting and welding wheel or ring 55, the faces of the pressure and guide rollers being grooved, as shown, or otherwise shaped and the inner periphery of the ring or wheel being shaped to correspond to the faces of the rollers, so that said ring or wheel is supported and guided on said rollers. Means must be provided for pressing the guide-rollers 54 and pressure-rollers 48 against the inner periphery of the planetary ring 55, so as to prevent the latter from dropping off said rollers. As a suitable means for this purpose I have shown a guide-post 56 secured to the lever 46 and passing through an opening in the lever 51, and interposed between said levers is a compression-spring 57, which tends to force the lever 51 away from the lever 46, thereby holding the rollers 48 and 54 firmly against the inner periphery of the planetary ring 55. The planetary ring 55 serves as the means for conducting the electric current to the tube to be welded, and in order to get a good contact between the tube and the conducting-ring the latter has its outer periphery concaved slightly to conform to the contour of the tube. It follows that for different-sized tubes conducting rings or wheels having different degrees of concavity must be used. These rings or wheels therefore are made interchangeable, and the means above described for mounting them permits of the easy and rapid removal of such ring and its replacement by another. For this purpose it is only necessary to move the guide-rollers 54 against the tension of the spring 57 sufficiently far to release the planetary ring 55 from said rollers, when another ring having a periphery of different concavity can be put in place. It is not necessary to use two guide-rollers 54, as a single one would serve the purpose; but the pair hold the ring 55 steadier. Neither is it necessary that the rollers 48 and 54 be grooved and the ring 55 be formed with a projection, as shown, as these parts may be reversed and may be made of any other contour than that shown. Furthermore, instead of using a spring for forcing the levers apart positive means—such, for instance, as an adjusting screw or bolt, as shown in Fig. 6—may be used for this purpose.

The welding mechanism on the two sides of the machine, as above stated, are identical, so that the two current-conducting devices 55 bear, respectively, on the opposite sides of the tube-joint, as shown, one of said conducting devices being connected to one pole of the source of electricity and the other to the opposite pole, so that the current will pass across the tube-joint and heat the edges of the bent-up plate. The current can be conducted to the rings 55 in any desired way, and I have shown for this purpose the brushes 60. Two pairs of such brushes are shown for each ring 55, each pair being mounted upon a bolt 61, which is secured in the outer end of the arm 62, projecting from the side of the lever 46. The terminals may be connected directly to the brush—as, for instance, by the binding-screws 64—or they may be connected to the bolts 61, or, indeed, to any part of the devices supporting the current-conducting rings 55. It is desirable, however, to connect the same as close to the brushes as possible in order to avoid passing the current across the joint in the mechanism and especially through lubricated bearings which are of high resistance.

To prevent the tube from turning so that the joint will not be between the conducting-rings 55, I provide a suitable guide-blade 65, which is adapted to project into the open joint of the tube in front of the welding mechanism, said guide-blade being supported on the inner end of an arm 66, adjustably secured to the front of one of the slide-posts 39.

To support the tube and hold it against the current-conducting devices 55, I employ a pair of rollers 67, which bear upwardly upon the lower outer side of the tube, as shown, and resultantly administer pressure for forcing the abutting edges of the tube against each other, so that when heated by the electric current the said edges will weld fast to each other.

In order to prevent the current passing through the pressure and supporting rollers 67 instead of passing across the tube-joint, it is desirable that these rollers occupy as small a portion of the tube circumference as possible, so as to leave wide air-gaps between themselves and the current-conducting devices. I have therefore shown the rollers as comparatively narrow. As a further aid, however, to prevent leakage of current around the tube and also to prevent grounding the current through the base of the machine I form these rollers of non-conducting material—such, for instance, as layers of fiber—the construction being clearly shown in the drawings. Said rollers 67 are mounted on inclined studs 68, secured in the upper end of a guide-post 69, which is vertically movable in a base 70 and is normally pressed upwardly by a spring 71, interposed between the head of said guide-post and a shoulder 72 on the post 73. This post is provided at its lower end with screw-threads, as shown, so that by turning it in one direction or the other the height of the shoulder 72 may be varied, thereby varying the position of the rollers 67 with reference to the axis of the tube. The post 73 is provided at its upper end with the extension 74, which projects through the head of the guide-post 69 and which has at its upper end a nut or other suitable stop 75 for limiting the upward movement of the guide-post 69 under the tension of the spring 71. Suitable means are provided for preventing the rotation or turning of the guide-post 69 in the base 70—such, for instance, as the set-screw 76, projecting through the base into a vertical slot 77 in the guide-post.

The operation of the machine will be understood from the foregoing description. Suffice it to say that after the current has been led to the conducting-rings 55 and all of the motors have been started the end of a plate is fed to the rolls 4 and 5, which grip the same, bend it up into trough shape, and feed it forward to the rolls 6, which complete the bending of the plate into tubular form and feed the same forward into the welding mechanism. The guide-blade 65 enters the joint of the tube and prevents the same from turning as it passes through the welding mechanism. The tube is supported by the spring-pressed rollers 67 and pressed against the conducting rings or wheels 55, which bear on opposite sides of the joint. The current from one of the conducting devices 55 passes across the joint of the tube to the other of said conducting devices, thereby heating the abutting edges, which under the resultant influence of the pressure of the rollers 67 are caused to weld together. The forward end of the tube is caught by the grip 32, and by means of the chain 31 the tube is drawn through the welding and bending mechanism at the desired rate of speed, the bending of the plate into tubular form and the welding of the same taking place continuously and progressively.

To adapt the welding mechanism to tubes of different sizes, the slide-posts 39 will be moved inward or outward, as necessary, and the slides 42 raised or lowered correspondingly. The contact-rings 55 will be replaced by others having the necessary concavity to fit the contour of the tube, and the levers 46 will be swung around their pivots 45 until the face of the contact-rings will bear squarely against the outer surface of the tube. In this way a good contact between the rings and the tube is assured, thereby permitting the passage of a current of large volume. In the operation of the welding apparatus the rings 55 revolve upon and around the rollers 48 and 54, so that this mechanism may be said to be of a planetary type. The current connections to the rings 55 are made through the brushes, as described, so that the current need not traverse any joints in the mechanism, and especially need not pass through lubricated bearings which are of high resistance.

What I claim as my invention, and desire to secure by Letters Patent, is—

1. In apparatus for welding pipes or tubes electrically, the combination of suitable supporting and holding devices for the tube, and two current-conducting devices respectively connected with opposite poles and adapted to bear on opposite sides of the tube-joint, said devices comprising supports and removable and interchangeable planetary conducting-rings rotatably mounted thereon.

2. In apparatus for welding pipes or tubes electrically, the combination of suitable supporting and holding devices for the tube, and electric-current-conducting devices adapted to bear on opposite sides of the tube-joint, said devices comprising suitable supporting-rollers and planetary conducting-rings rotatably mounted thereon.

3. In apparatus for welding pipes or tubes electrically, the combination of suitable supporting and holding devices for the tube, and two current-conducting devices adapted to bear on opposite sides of the tube-joint, each of said devices comprising a planetary conducting-ring, two or more supporting-rollers therefor, and means for holding said rollers against the inner periphery of the planetary ring.

4. In apparatus for welding pipes or tubes electrically, the combination of suitable supporting and holding devices for the tube, and two current-conducting devices adapted to bear on opposite sides of the tube-joint, each of said devices comprising a planetary conducting-ring, two or more supporting-rollers adapted to bear on the inner periphery of said ring, levers on which said rollers are mounted, and means for forcing said levers apart whereby the rollers are held against the inner periphery of the ring.

5. In apparatus for welding tubes or pipes electrically, the combination of suitable supporting and holding devices for the tube, and two current-conducting devices adapted to bear on opposite sides of the tube-joint, each of said devices comprising a planetary conducting-ring, rollers adapted to bear on the inner periphery thereof, a support for one of said rollers, a lever pivoted to said support and serving as a support for another of said rollers, and a spring between the support and lever for forcing the rollers apart and holding them against the inner periphery of the planetary ring.

6. In apparatus for welding pipes or tubes electrically, the combination of suitable supporting and holding devices for the tube, and two electric-current-conducting devices adapted to bear on opposite sides of the tube-joint, each of said devices comprising a planetary conducting-ring, supporting-rollers therefor adapted to bear on the inner periphery thereof, a pivoted lever on which one of said rollers is mounted, a supporting-arm for the other of said rollers, said arm being pivoted to said lever, and means for forcing said arm away from said lever to hold the rollers against the inner periphery of the planetary ring.

7. In apparatus for welding pipes or tubes electrically, the combination of suitable supporting and holding devices for the tube, and two current-conducting devices adapted to bear on opposite sides of the tube-joint, each of said devices comprising a planetary conducting-ring, and suitable supporting-rollers adapted to bear on the inner periphery of said ring, said rollers and said ring being provided with interlocking meeting faces.

8. In apparatus for welding pipes or tubes electrically, the combination with suitable holding and supporting devices for the tube, of two current-conducting devices adapted to bear on opposite sides of the tube-joint, each of said devices comprising a planetary conducting-ring, two or more supporting-rollers therefor, means for holding said rollers against the inner periphery of the ring, and means for adjusting said supporting-rollers toward and from the tube to be welded.

9. In apparatus for welding pipes or tubes electrically, the combination with suitable holding and supporting devices for the tube, of two electric-current-conducting devices adapted to bear on opposite sides of the tube-joint, each of said devices comprising a planetary conducting-ring, two or more supporting-rollers therefor, means for holding said rollers against the inner periphery of the ring, a pivoted lever on which said rollers are mounted, and means for adjusting said lever about its pivot.

10. In apparatus for welding pipes or tubes electrically, the combination with suitable supporting and holding devices for the tube, of two electric-current-conducting devices adapted to bear on opposite edge portions of the tube-joint, said devices each comprising a planetary conducting-ring, two or more supporting-rollers therefor, means for holding said rollers against the inner periphery of the ring, and means for adjusting said supporting-rollers both horizontally and vertically.

11. In apparatus for welding pipes or tubes electrically, the combination with suitable holding and supporting devices for the tube, of two electric-current-conducting devices adapted to bear on opposite sides of the tube-joint, said devices each comprising a planetary conducting-ring, two or more supporting-rollers therefor, pivoted levers on which said rollers are mounted, means for adjusting said levers about their pivots, and means for adjusting the lever-supports both horizontally and vertically.

12. In apparatus for welding pipes or tubes electrically, the combination with means for feeding the tube longitudinally, of two electric-current-conducting devices adapted to bear on opposite sides of the tube-joint, supporting devices for the tube located opposite said current-conducting devices, and means for yieldingly holding the same against the tube.

13. In apparatus for welding pipes or tubes electrically, the combination with means for feeding the tube longitudinally, of two electric-current-conducting devices adapted to bear on opposite sides of the tube-joint, adjustable supports for said devices, two rollers adapted to support the tube opposite said current-conducting devices, and means for yieldingly holding the same against the tube.

14. In apparatus for welding pipes or tubes electrically, the combination with spring-pressed supporting-rollers for the tube, of two current-conducting devices adapted to bear on opposite sides of the tube-joint, each of said devices comprising a planetary conducting-ring, supporting-rollers on which they are mounted, a support for said rollers and means for adjusting said support toward and from the tube to be welded.

15. In apparatus for welding pipes or tubes electrically, the combination with spring-pressed supporting-rollers for the tube, of two current-conducting devices adapted to bear on opposite sides of the tube-joint, each of said devices comprising a planetary conducting-ring, supporting-rollers therefor, a pivoted lever on which said rollers are mounted, and means for adjusting said lever about its pivot.

16. In apparatus for welding pipes or tubes electrically, the combination with spring-pressed supporting-rollers for the tube, of two current-conducting devices adapted to bear on opposite sides of the tube-joint, said devices comprising removable and interchangeable planetary conducting rings or wheels, pivoted levers on which they are rotatably mounted, and means for adjusting said levers about their pivots.

17. In apparatus for welding pipes or tubes electrically, the combination of two current-conducting devices adapted to bear against opposite sides of the tube-joint, of two rolls adapted to support the tube, an adjustable support for said rolls, and a spring between said support and the rolls.

18. In apparatus for welding pipes or tubes electrically, the combination with two electric-current-conducting devices adapted to bear on opposite sides of the tube-joint, said devices comprising removable and interchangeable rings or wheels, adjustable supports for the same, supporting-rollers for the tube, and an adjustable and yielding support for said rollers.

19. In apparatus for welding pipes or tubes electrically, the combination with positively-driven rolls for progressively bending a flat plate into tubular form, means for holding the same in such form and pressing the abutting edges against each other, current-conducting devices adapted to bear on opposite sides of the tube-joint and thus cause a current of electricity to flow across said joint and heat the edges of the plate, whereby said abutting edges are caused to weld together, and means for feeding the plate through the bending and welding devices.

20. In apparatus for welding pipes or tubes electrically, the combination with a pair of concave and convex rolls, of a pair of grooved rolls, heating and welding apparatus adjacent to said rolls, a drawing device, and independent electric motors for driving each of said pairs of rolls and said drawing device.

In testimony whereof I, the said GEORGE BAEHR, have hereunto set my hand.

GEORGE BAEHR.

Witnesses:
J. A. CAUGHEY,
W. H. SIGNET, Jr.